United States Patent [19]

Koizumi et al.

[11] Patent Number: 4,701,622

[45] Date of Patent: Oct. 20, 1987

[54] FLUORESCENT SCREEN HAVING A VARIATION IN SENSITIVITY AND METHOD OF MANUFACTURING THE SAME

[75] Inventors: Yuichiro Koizumi, Yokohama; Masaki Nojima, Urawa; Keiji Shimiya, Hiratsuka, all of Japan

[73] Assignee: Canon Kabushiki Kaisha, Toppan Printing Co., Ltd., and Kasei Optonix, Ltd., all of Tokyo, Japan

[21] Appl. No.: 652,567

[22] Filed: Sep. 20, 1984

[51] Int. Cl.[4] .............................................. G01N 21/64

[52] U.S. Cl. .............................. 250/486.1; 250/487.1; 378/51

[58] Field of Search ............... 250/483.1, 461.1, 484.1, 250/487.1, 488.1, 486.1; 378/51; 350/316, 117; 358/262

[56] References Cited

U.S. PATENT DOCUMENTS

| | | | |
|---|---|---|---|
| 2,310,852 | 2/1943 | Leverenz | 250/486.1 |
| 4,255,665 | 3/1981 | Shriner | 250/483.1 |
| 4,356,398 | 10/1982 | Komaki et al. | 250/486.1 |
| 4,394,581 | 7/1983 | Takahashi et al. | 250/484.1 |
| 4,479,061 | 10/1984 | Koizumi et al. | 250/483.1 |

FOREIGN PATENT DOCUMENTS

| | | |
|---|---|---|
| 3510425 | 5/1960 | Japan . |
| 5673400 | 6/1987 | Japan . |

*Primary Examiner*—Janice A. Howell
*Assistant Examiner*—David P. Porta
*Attorney, Agent, or Firm*—Fitzpatrick, Cella, Harper & Scinto

[57] ABSTRACT

A fluorescent screen having a sensitivity variation in which a plurality of gradations (continuous density variation) whose end edges are shifted by a predetermined distance is formed on a support of phosphor and a phosphor layer is provided thereon, and a method of manufacturing such screen.

8 Claims, 14 Drawing Figures

FLUORESCENT SCREEN HAVING A VARIATION IN SENSITIVITY AND METHOD OF MANUFACTURING THE SAME

BACKGROUND OF THE INVENTION

1. Field of the Invention

This invention relates to a fluorescent screen such as a fluorescent plate or an intensifying screen used in radiography, and particularly to a fluorescent screen partially having a sensitivity difference and a method of manufacturing the same.

2. Description of the Prior Art

In recent years, there has been a sharp increase in lung cancer, and the necessity of early detection thereof has been emphasized and examinations on a mass basis has occurred. Lung cancer is generally classified into the lung field type, created at the distal end or the like of the bronchus, and the hylar type, created near the thick pipe such as the trachea or the main bronchus. Of these two types, the lung field type lung cancer can be detected by chest radiography heretofore commonly practised, while the hylar type lung cancer can hardly be detected by the popular types of radiography because the hylar portion is photographed while overlapping the spine and heart or pulmonary artery. The hylar portion is thus not depicted when photograpy is effected so that the lung field is of an optimum photographic density.

At the same time, so-called scoliosis, in which the spine is curved, has sharply increased among school children and this, as well as lung cancer, has become a great social problem. Detection of this condition can also be advantageously conducted on a mass basis.

An intensifying screen for converting X-rays into visible light and sensitizing a film by it in radiography, as shown in FIG. 1 of the accompanying drawings, or a fluorescent screen used in the so-called photofluorography in which the X-ray converted into visible light is photographed on a reduced scale or a film through an optical system, as shown in FIG. 2 of the accompanying drawings, generally has phosphor uniformly applied to the whole surface thereof and the luminance thereof is uniform.

In FIG. 1, the X-ray image emitted from an X-ray source 1 and passed through an examinee 2 is formed as a visible image on a film 5 interposed between a frontal intensifying screen 4 and a back intensifying screen 6 through a grid 3.

Also, in FIG. 2, the X-ray image passed through the examinee 2 is formed as a visible image on a fluorescent screen 7 through the grid 3 and is projected onto a film 9 through a reducing optical system 8. Reference numeral 10 designates lead-containing glass.

In recent years, screens in which the sensitivity of a particular portion is improved as seen in Japanese Laid-open Patent Application No. 73400/1981 have been provided with the above-described mass-examination as the object. However, there is the medical practitioners' opinion that in these screens wherein a high sensitivity portion is partially provided, it is clinically inconvenient if the boundary line between the high sensitivity portion when observed as a photograph and the other portion is conspicuous.

As a method for partially improving the sensitivity in an intensifying screen or a fluorescent screen, many possible methods exist. There are methods such as partially increasing the thickness of the phosphor layer and improving the sensitivity, or a method of providing a light-reflecting layer such as a white pigment between the base screen and the phosphor layer and thereby improving the sensitivity of that portion. There are also methods such as of combining phosphors different in luminance, or a method of providing between the base screen and the phosphor layer an absorption layer comprising a colorant having a color such as black, blue or red, reducing the sensitivity of this portion as compared with that of the portion having no absorption layer and thereby providing a sensitivity difference. However, it is difficult to make the boundary between the high sensitivity portion and the low sensitivity portion inconspicuous by these methods. Also, it is difficult to make a number of homogeneous screens matching the desired specification. Japanese Utility Model Application Publication No. 10425/1960 discloses a system whereby printing or the like is effected on a base screen to thereby change the sensitivity, but by the latest trial manufacture, it has been confirmed that even if a base screen is subjected to gradation (continuous variation in density) type printing, which is generally practised, the boundary, between the portion of the base screen on which the printing is not effected and the portion on which the printing has been started, is photographed clearly and this is clinically inconvenient. FIG. 3 of the accompanying drawings shows the reflection density curve of a base screen (reflection density 0.06) subjected to fine dot printing of 200 lines per inch so that the density varies gradually. The highest density is 0.38 in terms of reflection density and the base screen is very smoothly printed with grey ink. A fluorescent screen manufactured by applying a uniform thickness of rare earth phosphor to this base screen was mounted on an X-ray mirror camera, and X-ray was applied with a phantom having a thickness of 10 cm as the object to be photographed and the phantom was photographed on a film. FIG. 4 of the accompanying drawings shows a transmission density curve obtained by scanning the density varying portion obtained on the film, by a micro-photometer. From this Figure, it is seen that the boundary between the portion of the base screen on which printing is not effected and the portion on which printing has been started is sharply varied in density as indicated at A on the transmission curve. This will be reproduced and result in an undesirable portion on a photograph used in diagnosis.

SUMMARY OF THE INVENTION

It is an object of the present invention to simply eliminate the inconvenience that the boundary between areas different in sensitivity appears clearly.

It is a further object of the present invention to enable the hylar portion and spine which could not be photographed when chest radiography was effected for the diagnosis of tuberculosis and lung field type lung cancer to be clearly photographed simultaneously.

It is still a further object of the present invention to obtain a photograph containing information useful for diagnosis where regions that vary greatly in X-ray absorption are photographed at the same time.

DESCRIPTION OF THE PREFERRED EMBODIMENTS

Figure 1:
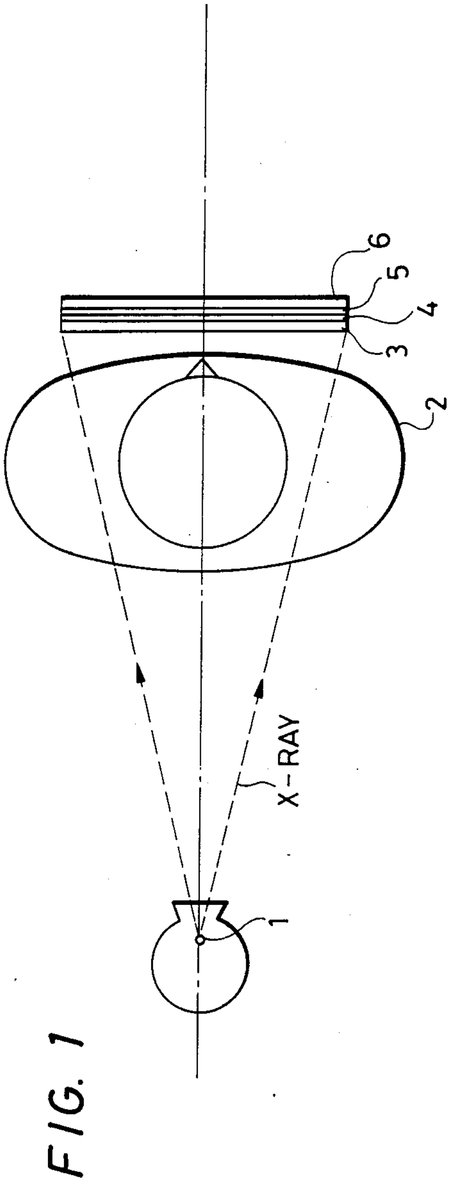
FIG. 1 is a view illustrating the principle of radiography.
Figure 2:
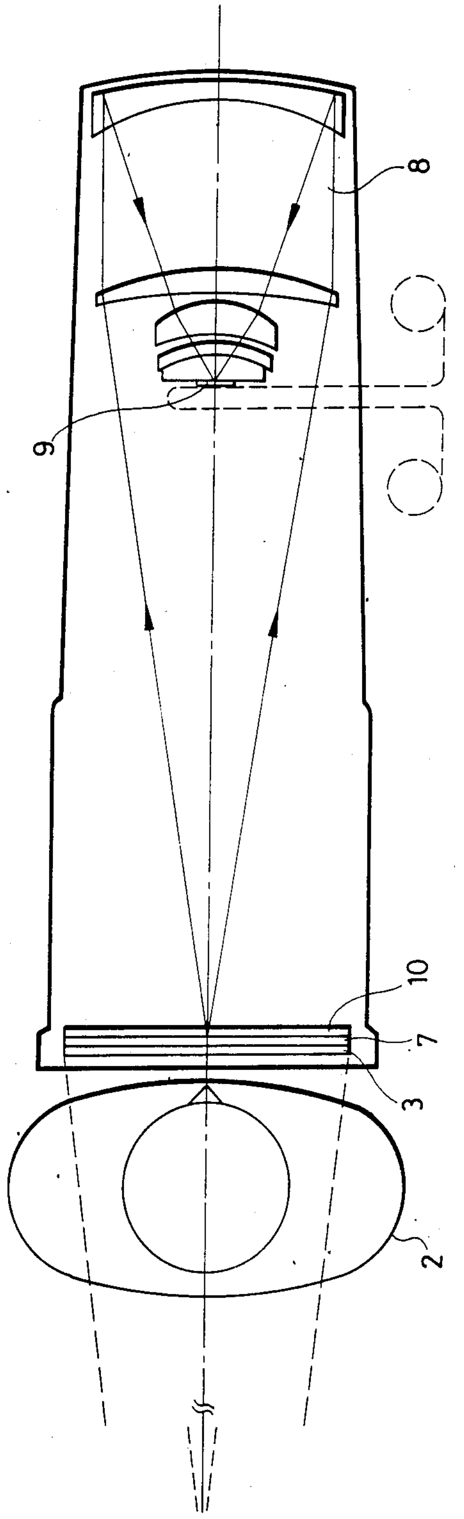
FIG. 2 is a view illustrating the principle of an x-ray mirror camera.
Figure 3:
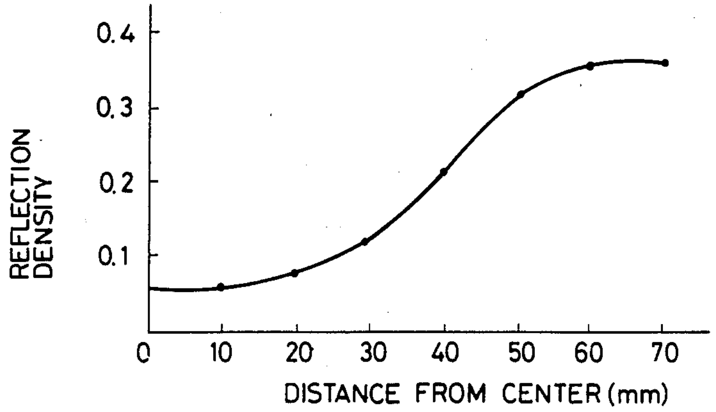
FIG. 3 is a graph of the reflection density of a fluorescent screen which provides the basis of the present invention.
Figure 4:
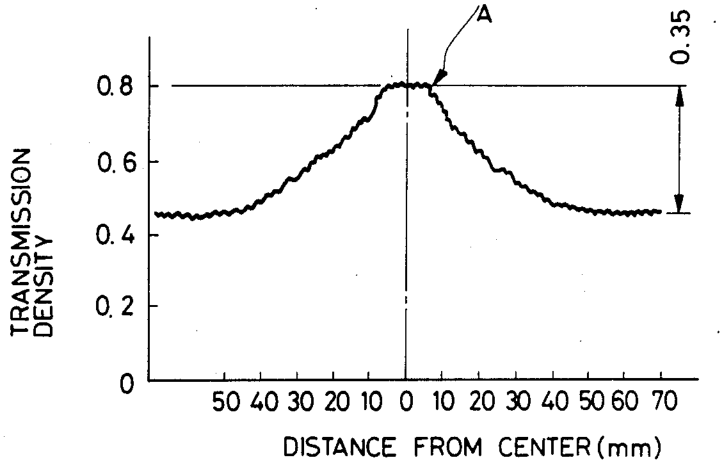
FIGS. 4 and 5 are graphs of transmission density.
Figure 5:
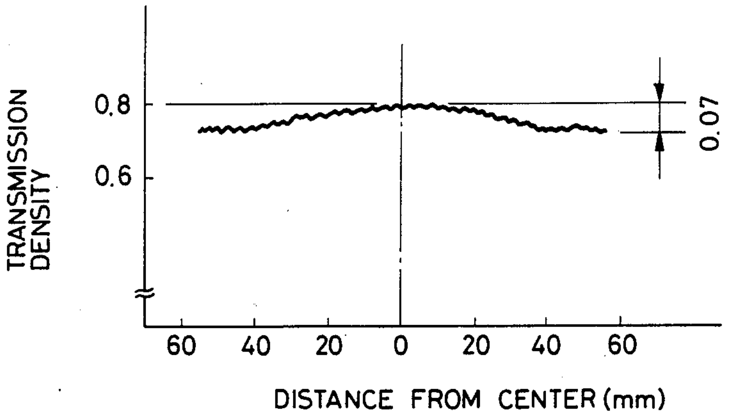

To eliminate the above-noted problem in the boundary of the portion in which the printing on a support which is a white high reflecting surface supporting a fluorescent layer has been started, when printing is effected in black ink, a plate of gradation is used to print so that the solid density becomes very thin or, with the luminescence spectrum of phosphor taken into account, a color ink having very small absorption with respect to the luminescence spectrum (for example, in a case where gadolinium series rare earth phosphor is applied, yellow ink having small absorption with respect to the bright line spectrum of 545 mμ which is greatest in luminance and highest in sensitivity to film of the luminescence wavelength of this phosphor) is used to effect gradation printing in a normal density. That is, the portion which is highest in sensitivity is left as white and the other portion is printed so that the density thereof increases gradually. Also, in the case of a color ink absorbing the luminescence spectrum to a certain degree, printing is effected with the density of the ink thinned in accordance with the absorption. Now, rare earth phosphor (which has several luminescence peaks in a wide wavelength range including the yellow range) was applied to a uniform thickness onto a base screen thus obtained in the intermediate process, the base screen was mounted on the X-ray mirror camera shown in FIG. 2, X-ray was applied by using a phantom having a thickness of 10 cm as the object to be photographed, and the phantom was photographed on a film. FIG. 5 shows a density curve obtained by photographing a fluorescent screen by means of the X-ray mirror camera, the fluorescent screen having been manufactured by using yellow ink, printing a gradation in the normal density and applying rare earth phosphor thereonto. As is apparent from FIG. 5, no sharp variation in density occurs in the white ground of the base screen as indicated at A in FIG. 4 and the boundary in which printing has been started, and a smooth curve is obtained and the photographic density difference as illustrated in FIG. 4 does not occur. However, in FIG. 4, when the photographic density of the portion of the highest density on the film is 0.8, there is obtained a density difference of about 0.35 between the high density portion and the low density portion, whereas in the case of FIG. 5, there is only obtained a density difference of about 0.07, and the intended performance cannot be achieved in a case where the lung field and the hylar portion are to be photographed at a time.

Figure 6:
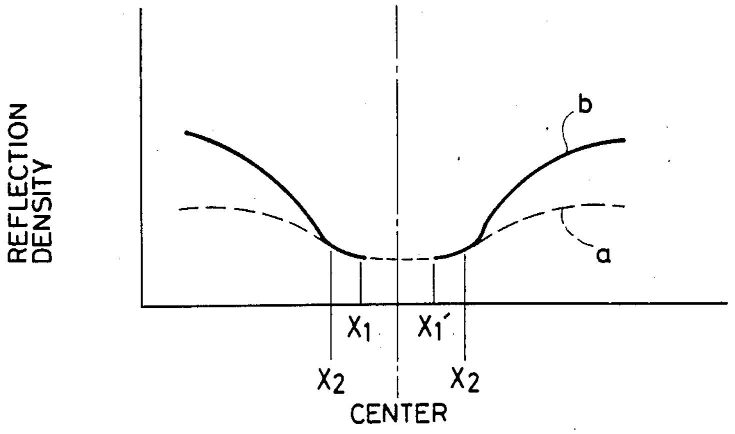
FIG. 6 is a graph of the reflection density in an embodiment of the present invention.
Figure 7:
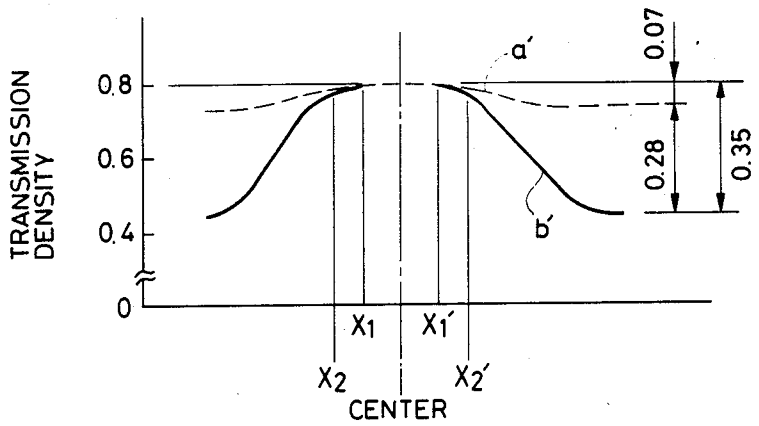
FIG. 7 is a graph of the transmission density in the same embodiment as FIG. 6.

As a result of the various tests carried out to solve this problem, printing was first effected in thin color ink or grey so that the curve as shown in FIG. 5 was obtained, and a further step of process was provided, that is, the color ink or grey was superposed on said print with the fore end of the gradation, i.e., the starting portion of the print, spaced apart outwardly by a predetermined distance, whereby a good result could be obtained. As an example, the gradation is first printed by yellow ink. In FIG. 6, the portions $X_1$ and $X_1'$ extending to the left and right, respectively, from the center are white portions which are not printed, and the gradation is printed toward the left and right therefrom by yellow ink so that the highest density is 0.8 in terms of reflection density with a complementary color filter inserted. This is indicated by curve a. At this time, yellow corresponds to the peak range of the luminescence wavelength of the rare earth phosphor and therefore, much reflection takes place and the transmission factor is high. Then, gradation is printed thereon by indigo ink from the locations deviated by 10 mm to the left and right with respect to the starting point of yellow, i.e., $X_2$ and $X_2'$ in FIG. 6, with such a thickness that the highest density is 1.1 in terms of reflection density. This is indicated by curve b. Rare earth phosphor of the same quality as the base screen was applied to the base screen superposed in this manner and photography was effected by the X-ray mirror camera, with a result that there was obtained a density curve indicated by a curve comprising a combination of the dotted line a' and the solid line b' of FIG. 7. As shown in this Figure, there was no such sharp density variation as indicated at A in FIG. 4 and a density difference 0.35 on the photograph could be obtained. When this was used clinically, a good result was obtained having no hindrance for diagnosis. Likewise, gradation was printed in thin grey ink so that the highest density of the gradation was 0.18 in terms of reflection density, and then was printed with the same dimensions as in the case of the yellow ink, that is, in an ink thinner than that used for $X_1$ and $X_1'$, and gradation was superposedly printed in grey ink thicker than the ink used at first, from $X_2$ and $X_2'$ deviated by 10 mm, and thus, printing was effected so that the total density was 0.70 in terms of reflection density. Again in this case, there was obtained a good result similar to that obtained by the use of two yellow and indigo inks.

When printing was effected by the use of the above-mentioned two yellow and indigo inks, the intended purpose would be achieved with the densities of the respective inks which are generally used for printing and not specially prepared. Where printing is effected by the use of color inks, it is not affected by the densities of the inks, and this is advantageous for mass production.

Figure 8:
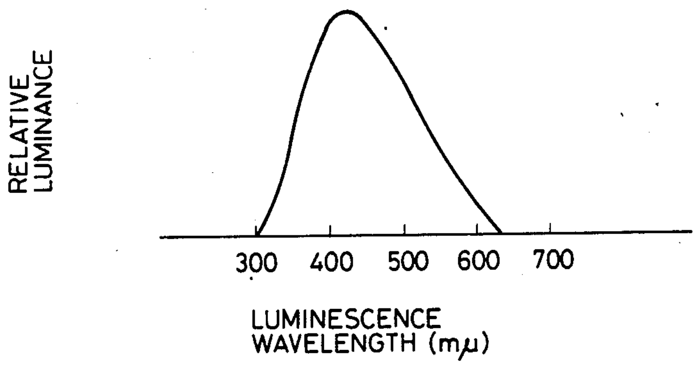
FIG. 8 is a graph showing the luminescence wavelength distribution of a $CaWO_4$ intensifying screen.

In the foregoing, description has been made of a case where rare earth phosphor is used, and where the present invention is applied to a $CaWO_4$ intensifying screen having as a component tungsten acid calcium generally used in radiography, the luminescence wavelength thereof is such as shown in FIG. 8. In this case, the gradation at the first time is printed in indigo ink which reflects the luminescence wavelength as much as possible, and then is printed in an ink having high absorption with respect to the luminescence wavelength, for example, yellow ink, whereby there can be obtained a gradation type intensifying screen having a desired sensitivity.

Again in this case, the intended purpose can of course be achieved by superposing by the use of thin grey ink and thick grey ink, as described above.

In the foregoing, description has been made of a method of making a fluorescent screen or an intensifying screen having a smooth sensitivity variation by combining two inks different in density and printing a gradation on the base screen, and further, the method of smoothly varying the sensitivity can of course be established also by a method using three or more grey inks different in density or a method of combining three or more color inks and printing a gradation. A combination of a color and grey is also of course possible.

Also, as a printing method for making a gradation, it is possible to adopt a method which uses not only a screen used in ordinary offset printing or type printing but also a parent-and-child screen in which the number of screen lines in the dark portion decreases to one half from the half tone area to the light portion and thereby reduces the step differences at the printing starting point.

Also, in the foregoing, description has been made by the use of a net screen used in offset printing or type printing, but of course, an identical result can be obtained even when plate making and printing are effected by the use of the conventional gravure or one of various inverted halftone gravures. While a method of making gradation has been described with respect to a fluorescent screen using rare earth phosphor and an intensifying screen consisting of $CaWO_4$, gradation can be obtained by a similar method with respect also to a fluorescent screen or an intensifying screen consisting of other component and different in luminescence wavelength from what have been previously described. Also, the amount of leftward or rightward shift for shifting the printing starting position between the first printing in which the density difference is reduced and the second printing for increasing the density difference may be suitably selected in accordance with the density gradient of the intended gradation, whereby the intended gradation can be obtained.

Where gradation of plural colors is to be printed, printing may be effected by a method in which the respective colors are not overlapped with one another but inks having respective gradations are successively shifted and arranged in a row and as a result, smooth gradation can be obtained.

Figure 9:
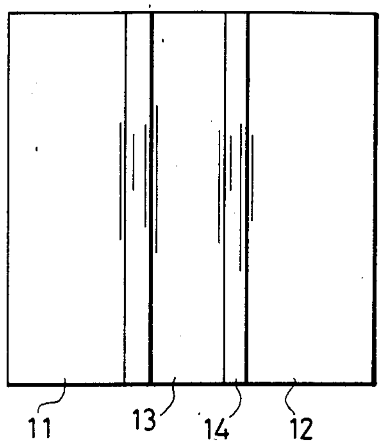
FIGS. 9, 10A and 10B are plan views showing examples of the division of an intensifying screen or a fluorescent screen.
Figure 10A:
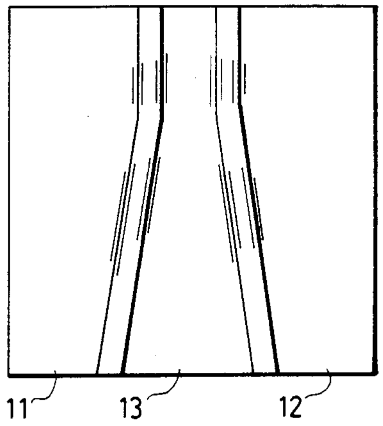
Figure 10B:
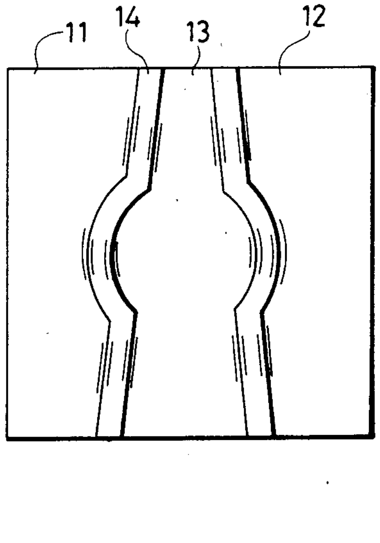

The intensifying screen or fluorescent screen of FIG. 9 is with respect to the case of chest radiography, and portions low in sensitivity into which the left and right lung fields are photographed when the chest of the human body is photographed from its fore and rear directions (which portions will hereinafter be referred to as the low sensitivity portions) are designated by 11 and 12. In contrast, a portion in which the sensitivity has been increased (which portion will hereinafter be referred to as the high sensitivity portion) is denoted by 13. The shape of the high sensitivity portion 13 may be the shape as shown in FIG. 9 or FIGS. 10A or 10B because in this case, it is desirable that it include the trachea and the spine as well as the heart and the hylar portion. Designated by 14 is an intermediate region.

Figure 11:
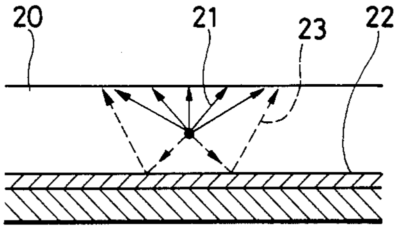
FIGS. 11 and 12 are cross-sectional views of the fluorescent screen.
Figure 12:
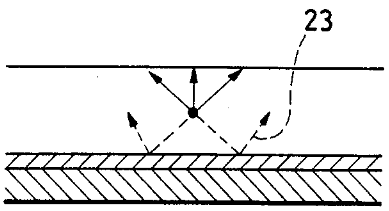
Figure 13:
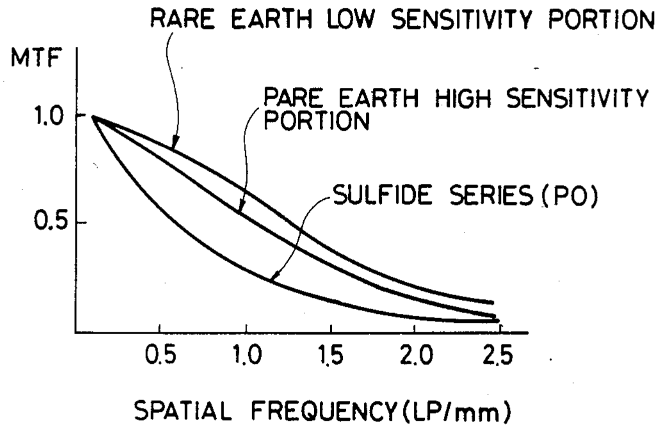
FIG. 13 is a graph of spatial frequency.

The sensitivity ratio with the low sensitivity portions will now be described. A uniform thickness of phosphor was applied to a printed base screen, and this was photographed by photofluorography and measured and calculated from the photograph density, with a result that in the high density portion as opposed to the low density portion, there could be obtained a sensitivity ratio which could be judged as clinically valuable by the medical practitioners (in the present trial manufacture, 1.8 times). Description will now be made of the sharpness of the image obtained on the film by the use of this sensitivity ratio. In the present trial manufacture, dots of 200 lines per inch were used as the dots to be printed on the base screen. The dots are 7.8 lines per millimeter and this is greater than the limit of the resolving power of the image obtained on the film by radiography and therefore, the dots of printing do not adversely affect the quality of the image. Even a smaller number of lines of dots may be used. In an intensifying screen or a fluorescent screen, the light emitted from phosphor 20 by the excitation of X-ray as shown in FIG. 11 generally comprises a light 21 travelling toward the surface of the intensifying screen or the fluorescent screen and a light 23 impinging on the surface 22 of the base screen and reflected therefrom toward the surface, and this contributes to the sensitization of the film. In the portion of the base screen of the present intensifying screen or fluorescent screen wherein printing of low reflection factor has been effected, the reflected light from the base screen is greatly decreased as shown in FIG. 12. As a result, as compared with the high sensitivity portion of the base screen in which the light reflection factor is high, the sensitivity is reduced, but the reflected light from the base screen, which is a factor for reducing the quality of the image, decreases and thus, the quality of the image made in the low sensitivity portion of the intensifying screen or the fluorescent screen is improved. FIG. 13 shows MTF curves indicative of the image characteristics of the low sensitivity and high sensitivity portions of the fluorescent screen by the present system using rare earth phosphor and the sulfide series fluorescent screen PO (produced by Kasei Optonics Co., Ltd.) heretofore used. It can be seen from this Figure that the high sensitivity portion is superior in MTF to the sulfide series and the low sensitivity portion is more superior. In this case, it has been confirmed that in sensitivity, the low sensitivity portion of the rare earth fluorescent screen manufactured for trial is improved by 1.2 times as compared with the sulfide series fluorescent screen PO when a water phantom (having a thickness of 10 cm) approximate to the chest of the human body in absorption is used as an absorbing member and photographed at an X-ray tube voltage 100 $KV_p$.

Also, according to the present invention, the printing system is adopted and therefore, there is an advantage that a number of intensifying screens or fluorescent screens having the same performance can be easily made at a time.

The intensifying screen or the fluorescent screen will be useful if it is used in a case where not only the chest but also regions greatly different in X-ray absorption such as the limbs and the abdominal region are to be photographed at a proper density simultaneously.

Thus, according to the present invention, the inconvenience where the boundary between areas different in sensitivity appears clearly can be simply eliminated.

According to the present invention, when radiography intended for the diagnosis of individual regions such as the lung field, the hylar portion and the spine portion is to be effected for the purpose of precise diagnosis, one can often shift a photograph instead of a plurality of photographs heretofore taken so as to obtain such a photographic density that the associated regions are suited for diagnosis. Also, to photograph the hylar portion or the spine, a great quantity of X-ray is required as compared with the photographing of the lung field portion, but according to the present invention, these regions can be photographed with the lung field portion and thus, it becomes possible for the medical practitioner to observe and diagnose the whole at a time, and this leads not only to improved diagnosis but also to decreased X-ray dose per photographing as well as a decreased number of photographs, which leads to a reduction in total X-ray dosage.

Also, if, in the mass survey by chest photofluorography heretofore carried out for elementary school children and junior and senior high school boys and girls, photography is effected with the fluorescent screen of the present invention incorporated into an X-ray mirror camera, there will be a great advantage that in addition to the early detection of tuberculosis, heart trouble, etc., the early detection of scoliosis becomes possible by the same quantity of X-ray as that heretofore used.

We claim:

1. A fluorescent screen with varied sensitivity, comprising:

a substrate provided thereon with a first surface treatment and a second surface treatment, said first surface treatment having a first gradual variation rate of reflection starting from a first predetermined position on a surface of said substrate and varying in one direction, and said second surface treatment having a second gradual variation rate of reflection different from said first rate and starting from a second position on said surface different from said first predetermined position and varying in said one direction; and a fluorescent layer provided on said substrate.

2. A fluorescent screen according to claim 1, wherein said first and second surface treatments have different hues.

3. A fluorescent screen according to claim 1, wherein said first and second surface treatments have different density gradients.

4. A fluorescent screen according to claim 1, wherein said second position resides inside of said first surface treatment, and said first and second surface treatments overlap each other only in part.

5. A fluorescent screen according to claim 1, wherein said second position starts from an end of said first surface treatment and wherein said first surface treatment and said second surface treatment affect different portions of said area.

6. A fluorescent screen with varied sensitivity, comprising:

a substrate provided thereon with an area having a predetermined reflectivity, a first surface treatment starting from a first position on said area with reflectivity thereof gradually varying, and a second surface treatment starting from a second position on said area deviated from said first position towards said first surface treatment, reflectivity of said second surface treatment also gradually varying at a greater variation rate than in the same direction as that of said first surface treatment; and a fluorescent layer provided on said substrate.

7. A fluorescent screen according to claim 4, wherein said area includes a central area without surface treatment.

8. A radiographic apparatus using a fluorescent screen with varied sensitivity, comprising:

an X-ray source;

a fluorescent screen comprising, a substrate provided thereon with a first surface treatment having a first gradual variation rate of reflection varying in one direction and starting from a first position and a second surface treatment having a second gradual variation rate of reflection different from said first rate varying in said one direction and starting from a second position different from said first position, and a fluorescent layer provided on said substrate; and means for receiving fluorescence from said fluorescent screen to form an X-ray image of an object to be examined.

* * * * *

UNITED STATES PATENT AND TRADEMARK OFFICE
CERTIFICATE OF CORRECTION

PATENT NO. : 4,701,622

DATED : October 20, 1987

INVENTOR(S) : YUICHIRO KOIZUMI, ET AL.

It is certified that error appears in the above-identified patent and that said Letters Patent is hereby corrected as shown below:

COLUMN 1

Line 17, "has" should read --have--.
Line 24, delete "tne".
Line 27, "photograpy" should read --photography--.

COLUMN 2

Line 5, delete "of".
Line 67, "x-ray" should read --X-ray--.

COLUMN 3

Line 68, "a" should read --the same--.

COLUMN 5

Line 19, "half tone" should read --halftone--.
Line 49, "is with respect to" should read --illustrates--.

COLUMN 7

Line 7, "a" should read --the same--.

COLUMN 8

Line 9, "said area." should read --said surface.--.
Line 23, "claim 4," should read --claim 6,--.

UNITED STATES PATENT AND TRADEMARK OFFICE

CERTIFICATE OF CORRECTION

PATENT NO. : 4,701,622

DATED : October 20, 1987

INVENTOR(S) : YUICHIRO KOIZUMI, ET AL.

It is certified that error appears in the above-identified patent and that said Letters Patent is hereby corrected as shown below:

SHEET 5, FIGURE 13

"PARE EARTH HIGH SENSITIVITY" should read --RARE EARTH HIGH SENSITIVITY PORTION--.

Signed and Sealed this

Thirty-first Day of May, 1988

*Attest:*

DONALD J. QUIGG

*Attesting Officer*

*Commissioner of Patents and Trademarks*